Figure 1:
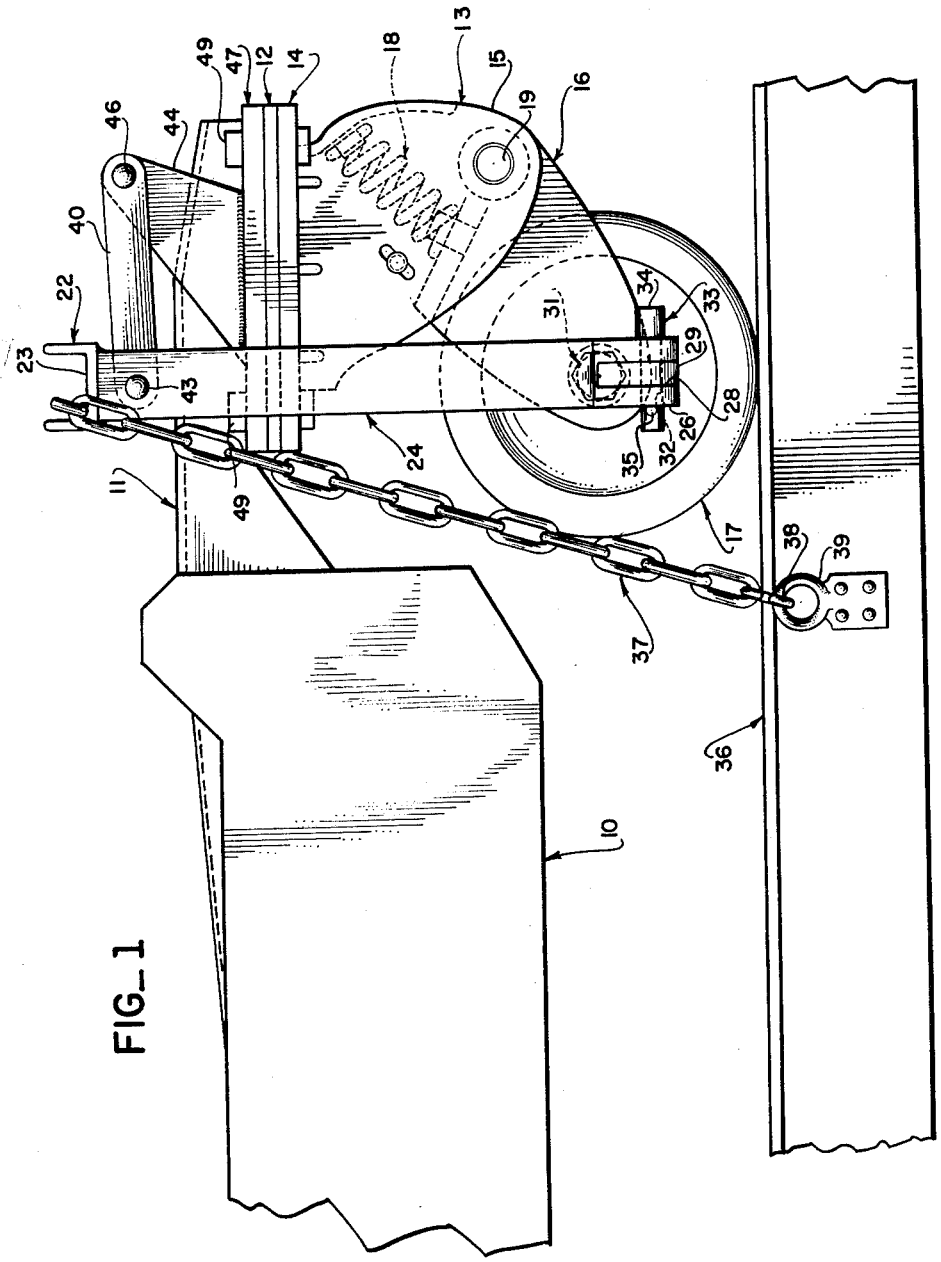

Dec. 4, 1962   D. C. OLSON ETAL   3,066,950
CARGO TIE-DOWN AND SUSPENSION APPARATUS
Filed June 23, 1961   2 Sheets-Sheet 2

INVENTORS
DAVID C. OLSON
ROBERT D. CLIFFORD
By [signature]
Agent 3,066,950
    CARGO TIE-DOWN AND SUSPENSION
              APPARATUS
David C. Olson, Burbank, and Robert D. Clifford, Canoga
  Park, Calif., assignors to Lockheed Aircraft Corporation, Burbank, Calif.
       Filed June 23, 1961, Ser. No. 119,238
              12 Claims. (Cl. 280—179)

The present invention relates to cargo tie-down and suspension apparatus and, more particularly, to apparatus suitable for securing heavy articles or equipment in fixed and/or suspended position while being transported on a carrier secured to a vehicle and, even more particularly with respect to a preferred embodiment, to such apparatus for reducing shock and dynamic loads encountered during vehicle transportation through the use of existing shock absorbing means normally provided on the equipment carrier.

It is the current practice to transport heavy equipment, such as aircraft engines, on a shipping stand or carrier to which the equipment is immovably secured by bolts, chains, straps or other fastening apparatus so that, for all purposes, the equipment and the carrier may be considered to be one integral body. In many cases, the carrier is provided with wheels attached to the four corners of the usually rectangular frame so that the carrier constitutes a mobile dolly. Such wheels may be swivelled to form casters. The wheels may be provided with brakes and casters may be additionally provided with swivel locks. The wheels, whether castered or not, may be provided with shock absorbers. Reference may be had to United States Letters Patent Numbers 2,904,331 and 2,738,542 for examples of carriers, dollies and shock absorbing casters mentioned hereinabove.

When shipping cargo by means of a vehicle such as a railroad car, truck, ship or aircraft, the cargo carrier must be secured to the flatbed of the vehicle to prevent shifting or other undesired lateral movement of the cargo carrier with respect to the flatbed. However, the vehicle is subjected to various shock forces during transportation movement and, if the carrier is secured to the flatbed so as to be completely immovable with respect thereto, all of such forces are transmitted by the flatbed to the carrier and, consequently, to the cargo. Obviously, there are innumerable types of cargo, including heavy equipment, which cannot withstand and should not be subjected to such forces because of the damage which may result. In addition, high dynamic or "G" loads may be introduced to the equipment. As a consequence, there have been many attempts in the past to provide carriers with shock absorbers to effectively isolate the cargo and its carrier from the forces exerted by the flatbed and dynamic loads.

However, conventional tie-down apparatuses compress the shock absorbers so that loads produced by the transportation vehicle are transmitted directly through the shock absorbers into the carrier and its cargo. If the tie-down apparatus is left sufficiently loose to permit the shock absorbers to function, then, to the extent of such looseness, the tie-down apparatus does not perform its function of preventing the cargo and its carrier from moving bodily relative to the flatbed. Furthermore, even if shock absorbing apparatus is used of a type that retains some degree of absorbing function although the carrier is securely tied down, conventional tie-down apparatus usually will not permit absorption of horizontal forces and permits absorption of vehicle forces only in an upward direction, i.e., when the flatbed is moving upwardly. Since the maximum vertical displacement of the carrier with respect to the flatbed is a fixed distance determined by the steady-state such displacement of the conventional tie-down apparatus, vertical forces occasioned by the dropping of the flatbed will be transmitted directly to the carrier by the tie-down apparatus.

Therefore, it is one of the objects of the present invention to provide cargo tie-down apparatus for securing cargo to the flatbed of a shipping vehicle to prevent bodily movement of the cargo with respect to the flatbed without inerferring with shock absorption features.

Another object of the present invention is the provision of tie-down apparatus for securing cargo and its carrier against bodily movement relative to a flatbed with suspension apparatus for absorbing shocks from the flatbed and "G" loads from the cargo and its carrier.

Another object of the present invention is the provision of cargo tie-down and suspension apparatus which utilizes existing shock absorbing means carried on or associated with the cargo or carrier for absorbing shock forces and dynamic "G" loads presented by the vehicle flatbed or introduced by the cargo itself.

According to the present invention, either the cargo or a cargo carrier is provided with force absorption apparatus having a bottom portion adapted to rest upon the flatbed of a vehicle, and tie-down and suspension apparatus is provided with means removably securable to such bottom portion and means for securing said tie-down apparatus to said flatbed for preventing gross bodily movement of the cargo with respect to the flatbed. The tie-down apparatus is provided with suspension apparatus secured to an upper portion of the cargo or its carrier. In a preferred embodiment of the present invention, the force absorption apparatus includes a caster assembly with a rotatable wheel adapted to rest upon the flatbed and a plate assembly securable to the cargo carrier and rotatable about a vertical axis with a non-linear force absorption means effectively disposed between the wheel and the plate assembly for absorbing shock loads transmitted by the flatbed to the wheel and dynamic or "G" loads transmitted by the cargo and its carrier to the plate assembly; the tie-down apparatus includes a bridge member having at least a pair of depending leg members and a cross member therebetween, the bottom end of at least one of the leg members being securable to the axle of the caster wheel for preventing rotation and bodily movement of such wheel, the leg members extending upwardly above the cargo carrier so that the cross member is located above the cargo carrier, the cross member being provided with channel means for receiving a chain or other securing means thereacross, such securing means being adapted to be removably fastened at both ends thereof to the flatbed for maintaining a downward force upon the bottom ends of the leg members and, thus, achieving the immovable relationship of the caster wheel with respect to the flatbed. Further, the tie-down apparatus is provided with arm means pivotally mounted at one end thereof to said bridge member above the cargo carrier and pivotally mounted at the other end thereof to the cargo carrier for permitting vertical movement both upwardly and downwardly of the cargo carrier with respect to the bridge member.

Figure 2:
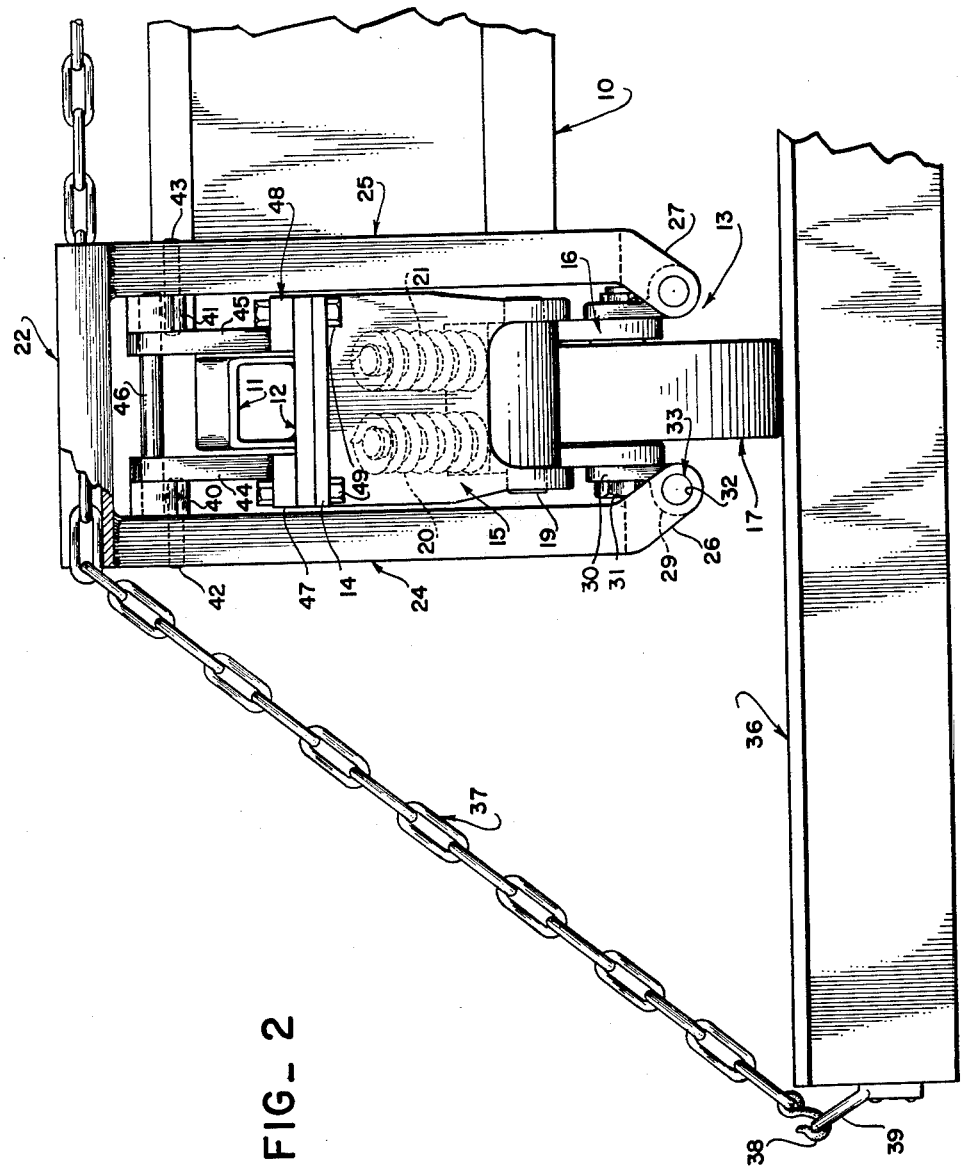

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is an elevational side view of one embodiment of cargo tie-down and suspension apparatus in accordance with the present invention, showing one of the four corner portions of a cargo carrier with its associated one of identical portions of the apparatus of the present invention; and FIGURE 2 is an elevational end view of the apparatus illustrated in FIGURE 1.

Referring to the drawings, there is seen a cargo carrier 10 having a horizontally projecting tongue member 11 provided at its end with an attachment plate 12 of generally rectangular configuration. A force absorbing caster assembly, generally indicated at 13, may be of the type disclosed in United States Patent No. 2,738,542 and includes a stationary plate 14 of generally matching configuration to the attachment plate 12 and upon which the plate 12 rests. The caster assembly 13 also includes a housing bracket 15 which is mounted to the stationary plate 14 in a manner to swivel about a vertical axis, a vertically movable part 16 carrying a wheel 17 with a cushion member 18 acting between the movable part 16 carrying a wheel 17 with a cushion member 18 acting between the movable part 16 and the housing 15 and urging the movable part 16 and its wheel 17 downwardly. The movable part 16 is vertically pivoted on the horizontal shaft 19 which is carried by the housing 15. The cushion member 18 may comprise a pair of coil springs 20 and 21 disposed in the non-linear force absorption manner illustrated in the aforesaid United States Patent No. 2,738,542.

The tie-down apparatus includes a cross member 22 having a horizontal channel 23 and a pair of depending leg members 24 and 25. The cross member 22 is located above the carrier tongue member 11 and is of sufficient length that its leg members 24 and 25 depending from the ends of the cross member 22 are laterally clear of the apparatus located therebelow. The bottom ends 26 and 27 of the respective leg members 24 and 25 are provided with grooves, such as groove 28, into which a tongue 29 is fitted, the tongue 29 being an extension of a bracket member 30 attached to the axle bolt 31 of the wheel 17. The leg member end 26 and the tongue 29 are horizontally bored 32 to receive a removable locking pin 33. The locking pin 33 is provided with an enlarged head 34 at one end and a cotter pin or other retaining means 35 at the other end. The locking pin 33 transmits vertical forces in either direction between the leg member 24 and the flat bed 36 through the wheel 17 and its axle 31. A chain 37 passes over the cross member 22 through the chain-retaining channel 23 and is fastened to the flatbed 36 at both of its ends as by the chain hook 38 and the flatbed loop 39. Any one of various means well-known in the art may be employed for tightening the chain 37 so as to exert a downward force upon the wheel 17 by means of the leg members 24 and 25 to prevent bodily movement of the wheel 17 with respect to the flatbed 36. It should be noted that none of the downward force exerted by the tie-down securing chain 37 is transmitted to the cargo carrier 10 and, in fact, that there is no contact between the channeled cross member 22 or its leg members 24 and 25 with the cargo carrier 10 and its horizontal tongue member 11 so that, as will be further noted hereinafter, the cargo carrier 10 is suspended free of the tie-down portion of the apparatus of the present invention.

A pair of arm members 40 and 41 are pivotally mounted at their ends to respective leg members 24 and 25 by means of respective pins 42 and 43 and to lugs 44 and 45 by means of a common pin 46. Lugs 44 and 45 are welded to respective mounting plates 47 and 48 which are of generally mating configuration with respect to the attachment plate 12 and are secured to both of plates 12 and 14 as by means of bolts 49. It should be noted that the tie-down chain 37 exerts a counter-clockwise torque, viewing FIGURE 1, on the bridge leg members 24 and 25 about the wheel axle 31, with a moment arm from the wheel axle 31, to the channel 23 of the cross member 22, and that the suspended cargo and its carrier 10 exert a clockwise torque on the bridge leg members 24 and 25 about the wheel axle 31 at the pin 43, with a moment arm from the pin 43 to the wheel axle 31. The pin 43 is located substantially adjacent to the channel 23 of the cross member 22 so that such moment arms are substantially the same. Thus, the static clockwise torque exerted upon the bridge leg members 24 and 25 may be readily counter-balanced with a static counter-clockwise torque exerted by the chain 37 with the initial static pre-loading force applied by the tie-down chain 37 in securing the wheel 17 to the flatbed 36. Further, the chain 37 and the other chain (not shown) on the other end of the cargo carrier 10 are symmetrically disposed fore and aft of the cargo carrier 10 with respect to their respective bridge members to overcome gross bodily movement of the cargo and its carrier in the fore and aft horizontal directions as well as to counterbalance the aforesaid torques involved. Shock and dynamic or "G" loads in the fore and aft directions will result in negligible variations in the differential torques applied to the bridge leg members 24 and 25 and such differences will be absorbed by the cushion member 18.

In normal operations, the cargo carrier 10 and the caster apparatus 13 operates as a dolly for moving about the cargo secured to the cargo carrier 10. In such case, all of the lock pins, such as 33, are removed from their locking engagement with their respective bridge leg members and bracket members, and the leg members 24 and 25 are rotated upwardly upon the pivot pins 42, 43 and 46 out of the way of the caster assembly 13 to permit free rolling of the wheels and castering thereof. Naturally, the chain 37 is absent or conveniently stowed upon the carrier 10. When the cargo carrier 10 is properly located upon the flatbed 36 of a vehicle for transportation thereby, the leg members are rotated downwardly and the end grooves are slipped over the tongues of the bracket members so that the lock pins may be inserted. Then, the chains are disposed over the channels of the cross members and tied down.

During transportation movement, various forces and loads are applied. For example, whether the vehicle is a truck, railroad car, aircraft or ship, the flatbed may rise or fall either abruptly or slowly, abrupt movement causing the introduction of shock loads, and slow movement causing the introduction of dynamic or "G" loads. That is, abrupt vertical movement of the flatbed in a downward direction causes the chain to exert a downward force upon the channel member and, through the leg members, upon the wheel axle. An abrupt vertical upward movement of the flatbed causes the wheel to exert an upward force upon the wheel axle. In either of such abrupt movement cases, the cushion member will either be tensed or compressed to absorb the shock load. The shock absorption forces of reaction will be exerted upon the cargo carrier in the well-known manner, and the cargo carrier will be free to move both upwardly and downwardly (as well as horizontally in accordance with horizontally resolved components of the forces) until the cushion member causes its damped absorption of the forces. In the case of slow vertical movement of the flatbed, potential energy will be imparted to the carrier and its cargo during such movement and such potential energy will be converted to dynamic or "G" loads upon termination or reversal of the movement. Insofar as the suspension apparatus and the cushion member are concerned, such loads are the same as shock loads and are absorbed in the same manner.

As far as horizontal forces in the fore and aft directions are concerned, it should be noted that the suspension portion of the tie-down apparatus is movably pivoted at a plurality of points, namely, pivot pin 46 and pivot shaft 19, as well as pivoted at fixed pin 43 and fixed axle 31, so that horizontal forces in the fore and aft directions will be resolved largely into vertical movements with only slight horizontal movements of the carrier on the suspension system.

It now should be clear that the present invention need not be practiced on a dolly type of cargo carrier with castering wheels, as illustrated, and that the vertically moving part 16 may rest directly upon the flatbed 36 rather than upon the wheel axle 31 and the wheel 17. Of course, the swivelling action also may be eliminated. Thus, in various applications where the cargo carrier 19 is moved about with separate motive equipment such as, for example, a fork lift or crane, the shock absorbing and suspension apparatus is utilized only when the leg members 24 and 25 of the tie-down portion are effectively secured to the bottom of the moving part 16.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. Tie-down apparatus for releasably securing a cargo carrier to the flatbed of a vehicle, such carrier being provided with force absorption support means having a bottom portion adapted to rest upon such flatbed, comprising: bridge means extendable above and across such support means; leg means depending from said bridge means and having end means releasably securable to the support means adjacent the lower extremity of such bottom portion; and flexible securing means removably securable to said flatbed and across said bridge means.

2. Tie-down apparatus for releasably securing a cargo carrier to the flatbed of a vehicle, such carrier being provided with force absorption support means having a bottom portion adapted to rest upon such flatbed, comprising: bridge means extendable above and across such support means and having upwardly disposed channel means; leg means depending from said bridge means and having end means releasably securable to the support means adjacent the lower extremity of such bottom portion; and flexible securing means removably securable to said flatbed and within said channel means along the length thereof.

3. Tie-down apparatus for releasably securing a cargo carrier to the flatbed of a vehicle, such carrier being provided with force absorption support means having a bottom portion adapted to rest upon such flatbed, comprising: bridge means extendable above and across such support means and having upwardly disposed channel means; leg means depending from said bridge means and having end means releasably securable to the support means adjacent the lower extremity of such bottom portion; flexible securing means removably securable to said flatbed and within said channel means along the length thereof; and arm means having opposite ends pivotally mounted effectively to said carrier and said bridge means, respectively.

4. Tie-down apparatus for releasably securing a cargo carrier to the flatbed of a vehicle, such carrier being provided with force absorption apparatus having a bottom portion adapted to rest upon such flatbed, comprising: bridge means extendable above and across such force absorption apparatus; leg means depending from said bridge means and having end means releasably securable to the force absorption apparatus adjacent the lower extremity of such bottom portion; and flexible securing means removably securable to said flatbed and across said bridge means.

5. Tie-down apparatus for releasably securing a cargo carrier to the flatbed of a vehicle, such carrier being provided with force absorption apparatus having a bottom portion adapted to rest upon such flatbed, comprising: bridge means extendable above and across such force absorption apparatus and having upwardly disposed channel means; leg means depending from said bridge means and having end means releasably securable to the force absorption apparatus adjacent the lower extremity of such bottom portion; and flexible securing means removably securable to said flatbed and within said channel means along the length thereof.

6. Tie-down apparatus for releasably securing a cargo carrier to the flatbed of a vehicle, such carrier being provided with force absorption apparatus having a bottom portion adapted to rest upon such flatbed, comprising: bridge means extendable above and across such force absorption apparatus and having upwardly disposed channel means; leg means depending from said bridge means and having end means releasably securable to the force absorption apparatus adjacent the lower extremity of such bottom portion; flexible securing means removably securable to said flatbed and within said channel means along the length thereof; and arm means having opposite ends pivotally mounted effectively to said carrier and said bridge means, respectively.

7. Cargo tie-down and suspension apparatus for releasably securing a cargo carrier to the flatbed of a vehicle in force-absorption relationship thereto, comprising: force-absorption means secured to said carrier in supporting relationship thereto and having a bottom portion adapted to rest upon such flatbed; bridge means extendable above and across said force-absorption means; leg means depending from said bridge means and having end means releasably securable to said force-absorption means adjacent the lower extremity of said bottom portion; and flexible securing means removably securable to said flatbed and across said bridge means.

8. Cargo tie-down and suspension apparatus for releasably securing a cargo carrier to the flatbed of a vehicle in force-absorption relationship thereto, comprising: force-absorption means secured to said carrier in supporting relationship thereto and having a bottom portion adapted to rest upon such flatbed; bridge means extendable above and across said force-absorption means; leg means depending from said bridge means and having end means releasably securable to said force-absorption means adjacent the lower extremity of said bottom portion; flexible securing means removably securable to said flatbed and across said bridge means; and arm means having opposite ends pivotally mounted effectively to said carrier and said bridge means, respectively.

9. Cargo tie-down and suspension apparatus for releasably securing a cargo carrier to the flatbed of a vehicle in force-absorption relationship thereto, comprising: force-absorption means secured to said carrier in supporting relationship thereto; wheel means provided with horizontal axle means connected to said force-absorption means in vertical force transmission relationship thereto, said wheel means being adapted to rest upon such flatbed; bridge means; leg means depending from said bridge means and having end means releasably securable to said axle means; and flexible securing means removably securable to said flatbed and across said bridge means.

10. Cargo tie-down and suspension apparatus for releasably securing a cargo carrier to the flatbed of a vehicle in force-absorption relationship thereto, comprising: force-absorption means secured to said carrier in supporting relationship thereto; wheel means provided with horizontal axle means connected to said force-absorption means in vertical force transmission relationship thereto, said wheel means being adapted to rest upon such flatbed; bridge means extendable above and across said force-absorption means and provided with upwardly disposed channel means; leg means depending from said bridge means and having end means releasably securable to said axle means; and flexible securing means removably securable to said flatbed and within said channel means along the length thereof.

11. Cargo tie-down and suspension apparatus for releasably securing a cargo carrier to the flatbed of a vehicle in force-absorption relationship thereto, comprising: force-absorption means secured to said carrier in supporting relationship thereto; wheel means provided with horizontal axle means connected to said force-absorption means in vertical force transmission relationship thereto, said wheel means being adapted to rest upon such flatbed; bridge means extendable above and across said force-absorption means and provided with upwardly disposed channel means; leg means depending from said bridge means and having end means releasably securable to said axle means; flexible securing means removably securable to said flatbed and within said channel means along the length thereof; and arm means having opposite ends pivotally mounted effectively to said carrier and said bridge means, respectively.

12. Cargo tie-down and suspension apparatus for releasably securing a cargo carrier to the flatbed of a vehicle in force-absorption relationship thereto, comprising: force-absorption means in supporting relationship to such carrier; wheel means provided with horizontal axle means connected to said force-absorption means in vertical force transmission relationship thereto and adapted to rest upon such flatbed; swivel means interconnecting said force-absorption means and said carrier for normally permitting castering of said force-absorption means and said wheel means; bridge means extendable above and across said force-absorption means and provided with upwardly disposed channel means; leg means depending from said bridge means and having end means releasably securable to said axle means; arm means having opposite ends pivotally mounted effectively to said carrier and said bridge means, respectively; and flexible securing means removably securable to said flatbed and within said channel means along the length thereof.

References Cited in the file of this patent
UNITED STATES PATENTS
2,738,542    Clark _____ Mar. 20, 1956